United States Patent
Eyres

[11] Patent Number: 6,130,975
[45] Date of Patent: Oct. 10, 2000

[54] METHOD OF INSTALLING AN OPTICAL FIBRE ELEMENT AND OPTICAL FIBRE ELEMENT FOR USE IN SUCH A METHOD

[75] Inventor: Alan Eyres, Warrington, United Kingdom

[73] Assignee: BICC Public Limited Company, London, United Kingdom

[21] Appl. No.: 09/011,497

[22] PCT Filed: Aug. 8, 1996

[86] PCT No.: PCT/GB96/01909

§ 371 Date: Jul. 24, 1998

§ 102(e) Date: Jul. 24, 1998

[87] PCT Pub. No.: WO97/06460

PCT Pub. Date: Feb. 20, 1997

[30] Foreign Application Priority Data

Aug. 10, 1995 [GB] United Kingdom .................... 9516405

[51] Int. Cl.[7] .............................. G02B 6/36; B65H 16/00; B63B 35/03
[52] U.S. Cl. ................................. 385/53; 385/76; 385/77; 385/100; 385/114; 385/123; 226/1; 226/2; 226/7; 254/134.3 R; 254/134.4
[58] Field of Search ..................................... 385/100, 114, 385/123, 127, 128, 53, 76, 77; 226/1, 2, 3, 4, 5, 6, 7, 8; 254/134.3 R, 134.4

[56] References Cited

U.S. PATENT DOCUMENTS

| | | | |
|---|---|---|---|
| 4,930,860 | 6/1990 | Tansey et al. | 385/100 X |
| 4,990,033 | 2/1991 | Handley et al. | 406/82 |
| 5,234,198 | 8/1993 | Heal et al. | 254/134.4 |
| 5,253,315 | 10/1993 | Fentress | 385/78 |
| 5,467,968 | 11/1995 | Proud et al. | 254/134.4 |
| 5,503,369 | 4/1996 | Frost et al. | 254/134.3 |

FOREIGN PATENT DOCUMENTS

| | | | |
|---|---|---|---|
| 0108590 | 5/1984 | European Pat. Off. | 385/100 X |
| 0422827 | 4/1991 | European Pat. Off. | 385/100 X |
| 0445858 | 9/1991 | European Pat. Off. | 385/100 X |

*Primary Examiner*—Brian Healy
*Attorney, Agent, or Firm*—Gary M. Nath; Gregory B. Kang; Nath & Associates

[57] ABSTRACT

A method and assembly of providing a building or other location with an optical fibre ribbon cable having a plurality of optical fibres terminated by a connector is provided. The method and assembly enable optical fibre ribbon cables to be terminated in a factory rather than on site, and then to be installed by blown fibre methods, even when the ribbon cable is terminated by connectors that are too large to be inserted in the duct. The assembly includes an optical fibre ribbon cable having a plurality of optical fibres, a unitary insert for a connector that terminates at least one end of the cable, and a housing for the connector which can be located about the insert to form a composite connector. The optical fibre ribbon cable as thus terminated is capable of being propelled along a duct by fluid drag of a gaseous medium. A building or other location is provided with the cable by introducing a leading end of the optical fibre ribbon cable, which has been terminated at at least its leading end by the unitary insert for the connector, into a bore of a duct and propelling the ribbon cable along the duct by fluid drag of a gaseous medium, and after the ribbon cable has been propelled along the duct, locating the housing of the connector about the insert to form the composite connector.

10 Claims, 1 Drawing Sheet

METHOD OF INSTALLING AN OPTICAL FIBRE ELEMENT AND OPTICAL FIBRE ELEMENT FOR USE IN SUCH A METHOD

BACKGROUND OF THE INVENTION

This invention relates to the provision of buildings and other locations with optical fibre elements.

A method for providing a building or other location with an optical fibre element by propelling the element along a previously installed duct using the fluid drag of a gaseous medium is described in European Patent Application NO: 108,590. This method has a number of advantages over prior methods of installation of optical fibres such as pulling the fibre cables by means of a pulling rope. In particular, because the gaseous medium imparts a distributed motive force along the length of the optical fibre element, stresses on optical fibre are reduced, especially where the route that the optical fibre is to take contains a number of bends. In such a case, pulling the optical fibre element along the route with a pulling cord would cause frictional drag on the fibre at the bends in the duct and, as stated in the application, only a few bends would be sufficient to cause locking of the optical fibre element.

Although this method of installing optical fibres is very successful, it has the disadvantage that the optical fibres must be terminated with connectors on site with the result that the quality of the termination may be poor and in any case is not under the control of the cable or connector manufacturer.

SUMMARY OF THE INVENTION

According to one aspect, the present invention provides a method of providing a building or other location with an optical fibre element that is terminated by a connector which comprises:

(a) introducing a leading end of the optical fibre element into the bore of a duct and propelling the element along the duct by fluid drag of a gaseous medium, the element being terminated at at least its leading end by an insert for the connector; and (b) after the element has been propelled along the duct, locating a housing of the connector about the insert to form the connector.

According to another aspect, the invention provides an assembly which comprises:

(a) an optical fibre element having at least one end that is terminated by an insert for a connector, and (b) a housing for the connector, which can be located about the insert to form a composite connector;

the optical fibre element being capable of being propelled along a duct by fluid drag of a gaseous medium.

Normally the duct will have been installed in the building or other location before the terminated optical fibre element is installed therein, but this will not always be the case.

Although it is only necessary according to the invention to terminate the leading end of the optical fibre element before it is blown along the duct it is preferred to terminate both ends of the optical fibre element before it is introduced into the duct. The or each optical connector is preferably provided on the optical fibre element in a production facility before the element is transported to the building or other location. The ability to terminate the optical fibre elements under factory conditions and to test the termination enables a significantly higher level of quality to be guaranteed in respect of the termination. The invention has the advantage that it enables the optical fibre elements to be terminated off site under factory conditions even though they may require connectors that are larger than the bore of the duct. Thus, the insert will have a maximum lateral dimension that is smaller than the bore of the duct while the housing of the connector will normally have a maximum lateral dimension that is greater than the bore of the duct.

The method according to the invention may employ any optical fibre elements that are installed by "blowing-in" methods for example single jacketed fibres (single buffered fibres), or optical fibre cables having a plurality of fibres. Preferably, the element is an optical ribbon cable that comprises a plurality of fibres. It may have any number of fibres provided that it can be installed by blowing although it preferably comprises not more than eight fibres and especially two fibres. The ribbon cable may be in the form described in U.S. Pat. No. 4,930,860 in which the individual fibres forming the cable are jacketed with a jacket to assist their blowing or the fibres may be assembled together to form a ribbon cable and the cable as a whole may be provided with single jacket to assist blowing of the cable.

The jacket that may be provided on the optical fibre element may be formed to any of a number of designs in order to assist blowing of the element. Ideally it should have a relatively low density and have an irregular surface and may also include a lubricant and/or antistatic agent in order to prevent sticking of the element to the duct walls. One jacket that may be employed is described in European Patent Application No: 345,968 and includes a filler, e.g. particulate PTFE, or microspheres in a radiation cured polymer.

As will be appreciated, the lateral dimensions of the insert will be considerably greater than the lateral dimensions of the optical fibre element, and will normally be almost as large as the bore of the duct We have found that even when the lateral dimensions of the insert are almost the same as the bore of the duct, the terminated element may still be satisfactorily blown into the duct. In particular, we have found that such inserts are able to negotiate bends in the duct during blowing-in without becoming jammed therein. At the same time, even when the insert is nearly the same size as the duct bore, it allows sufficient flow of the gaseous medium past it to cause the optical fibre element to be entrained by the medium and for the motive force on the fibre element to be distributed over the length of the element as indicated in European Application No: 108,590. Although in principle the insert may have any transverse shape, it may for this reason be preferred for it to have a transverse cross-sectional shape that differs from that of the bore, for example to have a rectangular shape. The maximum lateral dimension of the connector (i.e. diagonal dimension in the case of a connector having a rectangular cross-section) is preferably not more than 90% of the bore of the duct. It will normally have a maximum lateral dimension of at least 50% of the bore of the duct, and especially at least 75% of the bore.

Typically the duct will have a bore in the range of from 5 to 8 mm and the insert will have a maximum (i.e. diagonal in the case of inserts of rectangular cross-section) lateral dimension in the range of from 3 to 6 mm, while the composite connector formed by the housing and the insert will have a maximum lateral dimension in the range of from 5 to 12 mm.

BRIEF DESCRIPTION OF THE DRAWINGS

One form of method and assembly in accordance with the present invention will now be described by way of example with reference to the accompanying drawings, in which.

DETAILED DESCRIPTION OF THE INVENTION

Figure 1:
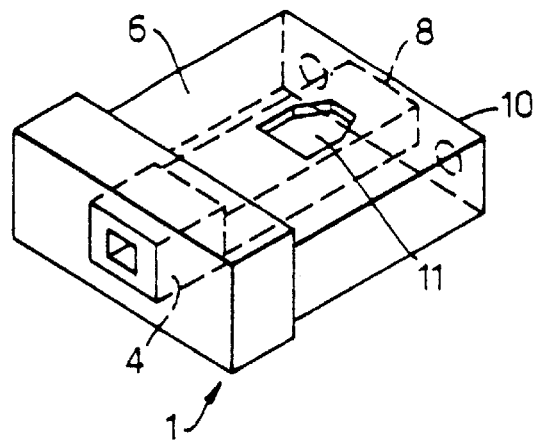
FIG. 1 is a schematic isometric view of a composite connector that may be employed in the present invention.
Figure 2:
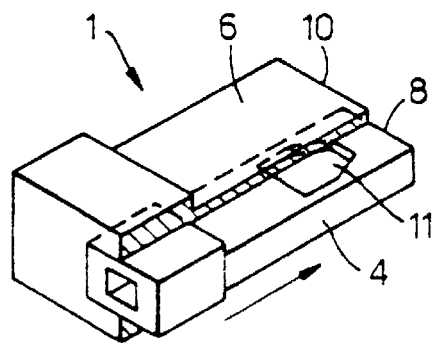
FIG. 2 is a schematic isometric view of the composite connector as shown in FIG. 1 with the housing partly cut away.

Referring to the accompanying drawings, an assembly for providing an optical link to equipment comprises a composite optical connector 1 which is intended to terminate an optical element comprising a pair of optical fibres. The composite connector has the same overall configuration and dimensions as the connector described in European Patent Application No: 505,197 and is intended to be intermatable therewith. The composite connector 1 comprises a central connector insert 4 which is designed to be moulded around the optical element so that the end faces of the optical fibres are flush with the end face of the insert, and centrally aligned therewith. The connector insert is capable of being inserted into the housing 6 in the direction of the arrow and snugly positioned therein so that the front end face 8 of the insert is flush with the front end 10 of the housing, and retained therein by means of a leaf-spring type retention clip 11 which snaps against an internal ridge (not shown) in the connector housing.

The assembly may be installed in a building or other location by a blowing method of the type described in European Patent Specification No: 108,590. One end of the optical element which has been terminated with the insert 4 is introduced into the bore of a previously installed duct which may extend around the building or other location in a convoluted path, and the optical element is propelled along the duct by a flow of air, until the leading end exits the duct at the desired location. The connector housing 6 can then simply be pushed onto the insert 4 in order to form the composite connector 1.

Figure 3:
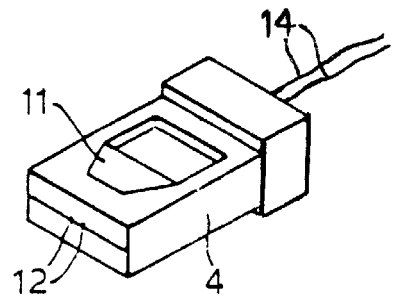
FIG. 3 is a schematic isometric view of a second form of insert together with optical fibres.

A slightly modified connector insert 4 together with the optical element is shown in FIG. 3 from the other direction so that the ends 12 of the optical fibres 14 forming the optical element can be seen.

I claim:

1. A method of providing a building or other location with an optical fibre ribbon cable comprising a plurality of optical fibres that is terminated by a connector which comprises:

(a) introducing a leading end of the optical fibre ribbon cable into a bore of a duct and propelling the ribbon cable along the duct by fluid drag of a gaseous medium, the ribbon cable being terminated at at least its leading end by a unitary insert for the connector; and (b) after the ribbon cable has been propelled along the duct, locating a housing of the connector about the insert to form the connector.

2. A method as claimed in claim 1, wherein the optical fibre ribbon cable is located in the insert by moulding.

3. A method as claimed in claim 1, wherein the optical fibre ribbon cable is located in the insert so that the end of the or each optical fibre is flush with an end of the insert.

4. A method as claimed in claim 1, wherein the housing of the connector is located about the insert by pushing the insert into the housing.

5. A method as claimed in claim 1, wherein the insert has a maximum lateral dimension that is smaller than the bore of the duct, and the housing of the connector has a maximum lateral dimension that is greater than the bore of the duct.

6. A method as claimed in claim 1, wherein the optical fibre ribbon cable comprises a pair of optical fibres.

7. An assembly which comprises:

(a) an optical fibre ribbon cable comprising a plurality of optical fibres having at least one end that is terminated by a unitary insert for a connector, and (b) a housing for the connector, which can be located about the insert to form a composite connector;

the optical fibre ribbon cable being capable of being propelled along a duct by fluid drag of a gaseous medium.

8. An assembly as claimed in claim 7, wherein the optical fibre ribbon cable comprises a pair of optical fibres.

9. An assembly which comprises:

(a) an optical fibre ribbon cable comprising a plurality of optical fibres having at least one end that is terminated by a unitary insert for a connector, and (b) a housing for the connector, which can be located about the insert to form a composite connector;

the terminated end of said optical fibre ribbon cable being capable of being propelled along a duct by fluid drag of a gaseous medium.

10. An assembly as claimed in claim 9, wherein the optical fibre ribbon cable comprises a pair of optical fibres.

* * * * *